United States Patent [19]

Hunt

[11] Patent Number: 5,860,770
[45] Date of Patent: Jan. 19, 1999

[54] METHOD OF SOIL EROSION CONTROL

[75] Inventor: James R. Hunt, Tucker, Ga.

[73] Assignee: A Creative Research & Testing Co., Ga.

[21] Appl. No.: 872,381

[22] Filed: Jun. 10, 1997

[51] Int. Cl.$^6$ ................................................ C09K 17/00
[52] U.S. Cl. .................. 405/264; 523/132; 47/1.01 F; 71/903
[58] Field of Search ........................ 465/263, 264; 435/180, 182, 183, 198, 200, 212; 523/131, 132; 524/17, 18, 20, 704; 47/1.01 F, 58; 111/118, 129; 427/136; 71/903

[56] References Cited

U.S. PATENT DOCUMENTS

| | | | |
|---|---|---|---|
| 2,961,799 | 11/1960 | Coe | 47/9 |
| 3,174,942 | 3/1965 | Erickson et al. | 523/132 |
| 3,643,444 | 2/1972 | Hodgson | 405/264 |
| 3,791,927 | 2/1974 | Forgione et al. | 435/182 |
| 3,887,506 | 6/1975 | Hewitt | 523/132 |
| 4,106,296 | 8/1978 | Leonard, Jr. et al. | 405/264 |
| 4,136,050 | 1/1979 | Brehm | 404/76 X |
| 4,168,593 | 9/1979 | Jankowiak | 405/264 X |
| 4,269,941 | 5/1981 | Ichmura | 435/182 |
| 4,303,438 | 12/1981 | Zaslavsky et al. | 71/903 X |
| 4,492,757 | 1/1985 | Kato et al. | 435/115 X |
| 4,507,411 | 3/1985 | Gordon et al. | 523/436 |
| 4,592,931 | 6/1986 | Cargle | 405/264 X |
| 4,610,311 | 9/1986 | Bronner et al. | 404/76 X |
| 4,746,543 | 5/1988 | Zinkan et al. | 427/136 |
| 5,514,412 | 5/1996 | McArdle | 427/136 |
| 5,648,116 | 7/1997 | Roe et al. | 427/136 |

*Primary Examiner*—Tamara L. Graysay
*Assistant Examiner*—Jong Suk Lee
*Attorney, Agent, or Firm*—John Lezdey & Assoc.

[57] ABSTRACT

A composition is provided to control soil erosion and for conditioning soil to prevent fugitive dust and stabilizing roadway surfaces. the composition contains monomeric resins, enzymes, surfactants and water. The composition can be sprayed onto the soil or admixed and distributed with the soil and followed by compacting with a roller or pneumatic compactor.

11 Claims, No Drawings

METHOD OF SOIL EROSION CONTROL

FIELD OF THE INVENTION

The present invention relates to soil erosion control and to road bed construction. More particularly, there is provided compositions and methods for preventing soil erosion and for conditioning soil surfaces to permit use of dirt roads by vehicles during construction through the use of enzymes and film forming resins.

BACKGROUND OF THE INVENTION

A particular problem encountered, however, in using such film forming latices for soil erosion control is the limit on the useful life of the deposited film caused by the tendency of the film to deteriorate upon weathering and leaching of hydrophilic components which break the continuity of the film and destroy the ability of the film to hold the surface soil particles together. We have found that the useful life of such films and their ability to bond the surface soil particles can be increased, such that one application will last as long as four months without maintenance, by adding to a latex a resinate compound and enzymes in an aqueous composition.

As is well known in this art (see U.S. Pat. No. 2,961,799) the latex should form a water-insoluble rubbery film and, hence, almost any elastomer-forming polymer can be used. Thus, for example, natural rubber latex, reclaimed rubber latex, latices of synthetic materials such as polyisoprene, nitrile rubber, polysulphide, silicone rubber, polyester rubber and the like have been suggested. We have found, however, from the standpoint of the film produced, best results are obtained utilizing latices of butadience-styrene copolymer, butyl rubber and neoprene. Generally, in usage, the latex composition should be diluted with water to reduce the polymer solids content to about 10 to 30 parts per thousand for best results in application to the soil using conventional spraying equipment. Generally, the amount of polymer required for permeable films is on the order of 150 pounds per acre, while non-permeable films can be obtained on the order of 500 pounds of polymer per acre.

There are four primary categories of enzymes. 1. Protease 2. Lysase 3. Amylase and 4. Cellulase. Protease and Amylase enzymes work well together and are commonly formulated in detergent compositions for removal of soil. For enzymes to provide a zymalytic reaction, they must function at a pH of about 6.0 to 8.5 and in a composition containing less than 50% water.

U.S. Pat. No. 3,174,942 to Erikson discloses a soil erosion control composition which contains a diene latex in combination with bentonite. The compositions produce a rubbery, continuous and porous film which is bonded to the surface soil particles.

U.S. Pat. No. 4,592,931 to Cargle, which is herein incorporated by reference, discloses a method of treating soil to enhance its geotechnical properties with a composition containing homopolymers and copolymers of acrylic acid which can be used in the present invention.

SUMMARY OF THE INVENTION

The present invention provides for a method and composition for treating soil for stabilization and fugitive dust control. The method comprises the steps of distributing a composition having a pH of about 6.0 to 8.5 by the steps of 1) distributing an aqueous mixture of a) a film forming resin selected from the group consisting of acrylic methacrylic and vinyl homopolymers and copolymers, b) a wetting agent, c) about 10 to 50% by weight of water, and d) an effective amount of an enzyme selected from the group consisting of protease, lysase and amylase to provide a zymalytic reaction, and 2) curing the resin.

Advantageously, a latex of an elastomer-forming polymer is incorporated into the composition. Preferably, the elastomer-forming polymer is rubber crumb.

It is therefore a general object of the invention to provide a method and composition for stabilizing soil and provide for fugitive dust control.

It is another object of the invention to provide a method for utilizing waste rubber crumb.

It is yet another object of the invention to provide a composition which can be used for road construction.

DESCRIPTION OF THE PREFERRED EMBODIMENTS

According to the present invention, there is provided compositions and methods for the prevention of soil erosion and to prevent fugitive road dust. The compositions of the invention for preventing soil erosion includes a composition which can be sprayed or distributed on soil alone or in combination with other ingredients. Basically, the composition comprises:

A. about 10 to 40% by weight of a film forming monomeric resin selected from the group consisting of methacrylic, acrylic and vinyl acetate;
B. about 1 to 5% by weight of a surfactant;
C. about 10 to 50% by weight of water; and
D. an effective amount of an enzyme selected from the group consisting of protease, amylase and lysase to provide an zymalytic reaction.

Preferably, the composition contains about 10 to 50% by weight of enzyme.

The method of the invention comprises the steps of:

1. distributing the composition of the invention at a pH of about 6.0 to 8.5 alone or in admixture with soil or other materials; and
2. curing the resin.

Advantageously, the soil is mixed with latex particles. Preferably, rubber crumb is used in an amount of about 5 to 20% by weight of the soil and composition being distributed. The soil can contain flyash and/or clay.

It is believed that once the soil is wetted, the enzymes in the composition begin to react with the humus and the bacteria in the soil. The result is a hydrogel state which develops to stabilize the soil mixture to form a bond between the rubber crumb and/or other ingredients in the soil within 2–4 hours. The whole bonding reaction caused by the enzymes through a zymalytic reaction. The enzymatic catalysts are proteins composed of repeating units of amino acid.

The latex particles which may be used are those which can form a water-insoluble rubbery film, and hence almost any elastomer may be used. Thus, for example, natural rubber latex, reclaimed rubber latex, latex of synthetic material such as polyisoprene, nitrile rubber, polysulphide, silicone rubber, polyester rubber and the like have been suggested.

The film forming resins which can be used in the compositions of the invention include acrylic acetate, methacrylic acetate, vinyl acetate or mixtures thereof.

Other film forming resins may be included through various monopolymers and copolymers of acrylic acid which have a molecular weight of from 5,000 to 30 million as described in U.S. Pat. No. 4,592,931.

The compositions can contain any of the conventional surfactants or a combination of surfactants.

Suitable anionic surfactants include alkyl diethylamine oxides having 12 to 25 carbon atoms such as N,N-dimethyl-1-tetradecanamine oxide and N,N-dimethyl-1-octadecanamine oxide, sodium lauroyl sarcosinate, diphenyl ether sulfonates such as the alkali metal salts of hexadecyl diphenyl ether disulfonic acid, dodecyl diphenyl ether disulfonic acid and decyl diphenyl ether disulfonic acid, preferably $C_{10}$–$C_{18}$ alkylbenzene sulfonates. Commercially available anionic surfactants which may be used include UFARYL DL80, DL85 and DL90 of Unger Fabrikker which are mixtures of $C_{10}$–$C_{13}$ linear sodium alkylbenzene sulfonate, UDET 950 of De Soto, NACCONOL 90G of Stepan Corporation (a $C_{11.7}$ linear alkybenzene sulfonate), CALSOFT F90 of Pilot Corporation (a $C_{10}$–$C_{13}$ sodium linear alkylaryl sulfonate), WITCONATE 90F of Witco Corporation (a $C_{12}$ sodium alkylaryl sulfonate containing 1.7% free oil and 3.0% $SO_4$), NANSA HS 80PF of Albright & Wilson Ltd and STEPAN AGENT X-1509–65 of Stepan Corporation (a $C_{13}$ calcium dodecylbenzene sulfonate).

Nonionic surfactants that may be included are the condensation products of a long chain ethylene oxide moiety with an aliphatic alcohol preferably a primary or secondary aliphatic alcohol or alkyl phenol, preferably the primary or secondary alcohol contain 6 to 18 carbon atoms and the alkyl phenol-based moiety is one wherein the alkyl chain is straight or branched and contain 6 to 12 carbon atoms, preferably 6 to 9 carbon atoms.

Illustrative nonionic surfactants having the desired characteristics for formulation are available on the market under the tradename of NEODOL products by Shell Oil Company; TERGITOL products by Union Carbide Company; and ALFOL products by Continental Oil Company. Specific examples include "NEODOL 25-7" (linear $C_{12}$–$C_{16}$ primary alcohol condensed with 7 moles of ethylene oxide per mole of alcohol); "NEODOL 45-7" (linear $C_{14}$–$C_{15}$ primary alcohol mixture condensed wtih 7 moles of ethylene oxide per mole of alcohol); "TERGITOL 15-S-7" (random secondary $C_{11}$–$C_{15}$ alcohol condensed wtih 7 moles of ethylene oxide per mole of alcohol); and "ALFOL 1416-6.5" (primary $C_{14}$–$C_{16}$ alcohol condensed with 6.5 moles of ethylene oxide per mole of alcohol).

The following examples further illustrate the present invention but are not intended to be limiting thereof.

EXAMPLE 1

A composition for spraying soil to prevent erosion was prepared by admixing the following ingredients.

| Ingredient | Wt % |
| --- | --- |
| Vinyl acetate | 45.0 |
| TERGITOL | 1.0 |
| Protease Amylase Enzymes | 20.0 |
| Potassium per sulfate | 0.2 |
| Patassium chloride | 0.4 |
| Sodium bicarbonate | 0.5 |
| CELLO SIZE WP300 | 0.2 |
| GA fax Re-960 | 1.9 |
| Water | q.s. |

EXAMPLE 2

Roadway construction is performed according to the following steps:

1. A dirt road is shaped and graded to a depth of 2–3 inches.
2. Crumb rubber is added and the bed is pulverized with a disc and blade machine to assure an even mixture of soil and rubber.
3. The bed is sprayed with the composition of Example 1 and the soil, rubber crumb and composition are pulverized with the disc machine.
4. The soil is spread back on the road and the road is compacted with a roller or pneumatic compactor.
5. The roadway is then allowed to cure for at least 72 hours.

EXAMPLE 3

A composition for spraying on soil to prevent erosion is prepared by admixing the following ingredients.

| Ingredient | Wt % |
| --- | --- |
| Acrylic acetate | 40.0 |
| Nonylphenol ethylene oxide | 5.0 |
| Protease Amylase enzymes | 35.0 |
| Water | 20.0 |

The composition can be sprayed along a bank to prevent erosion.

What is claimed is:

1. A method of treating soil comprising the steps of: 1) distributing a soil treating composition have a pH of about 6.0 to 8.5 comprising an aqueous mixture of: a) a film forming resin selected from the group consisting of acrylic and vinyl homopolymers and copolymers, b) a wetting agent, c) about 10 to 50% by weight of water and d) about 10 to 50% by weight of an enzyme selected from the group consisting of protease, lipase and amylase to provide a zymalytic reaction and 2) curing said resin, said composition being used alone or in combination with soil.

2. The method of claim 1 wherein said composition includes a latex of an elastomer-forming polymer.

3. The method of claim 2 wherein said elastomer-forming polymer is rubber crumb.

4. The method of claim 1 wherein said composition comprises about 5 to 20% by weight of rubber crumb.

5. The method of claim 1 wherein said composition is distributed by spraying.

6. The method of claim 1 wherein said distributing is by intimately mixing said composition with soil.

7. The method of claim 6 wherein said intimately mixing said composition with said soil is followed by compacting the soil.

8. The method of claim 1 wherein said enzyme comprises protease and amylase.

9. The method of claim 1 wherein said resin is an acrylic resin.

10. The method of claim 9 wherein said resin is selected from the group consisting of alkyl acrylate, alkyl methacrylate, acrylic acid, methacrylic acid and vinyl acetate.

11. The method of claim 1 comprising about 10 to 40% by weight of film forming resin.

* * * * *